W. F. Beecher,
Gas Furnace.
No. 113,481. Patented Apr. 11, 1871.
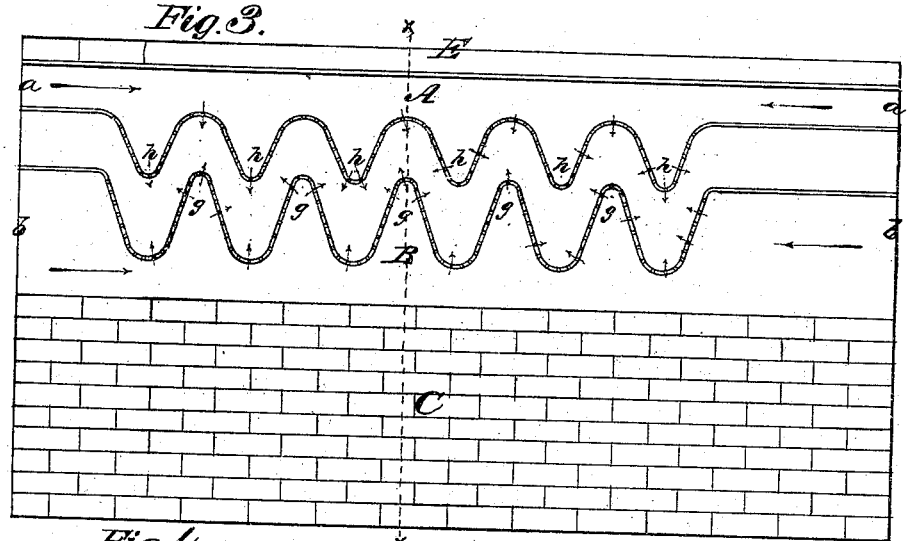
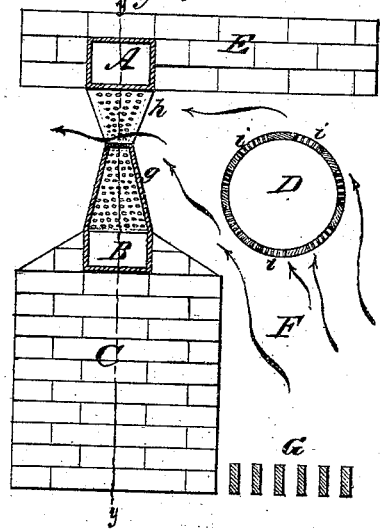
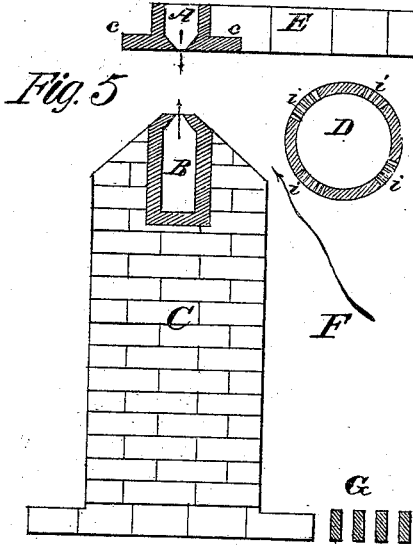
Witnesses.
Inventor
William F. Beecher W. F. Beecher,
Gas Furnace.

No. 113,481. Patented Apr. 11, 1871.

Witnesses
R. J. Campbell
J. N. Campbell

Inventor
Wm. F. Beecher
by
Mason, Fenwick & Lawrence.

United States Patent Office.

WILLIAM FORDYCE BEECHER, OF PITTSBURG, PENNSYLVANIA.

Letters Patent No. 113,481, dated April 11, 1871.

IMPROVEMENT IN THE FIRE-CHAMBERS OF PUDDLING, STEAM-BOILER, AND OTHER FURNACES.

The Schedule referred to in these Letters Patent and making part of the same.

*To all whom it may concern:*

Be it known that I, WILLIAM FORDYCE BEECHER, of Pittsburg, in the county of Allegheny and State of Pennsylvania, have invented certain new and useful Improvements in the Construction of Fire-Chambers of Furnaces; and I do hereby declare that the following is a full, clear, and exact description thereof, reference being had to the accompanying drawing making part of this specification, in which—

Figure 1:
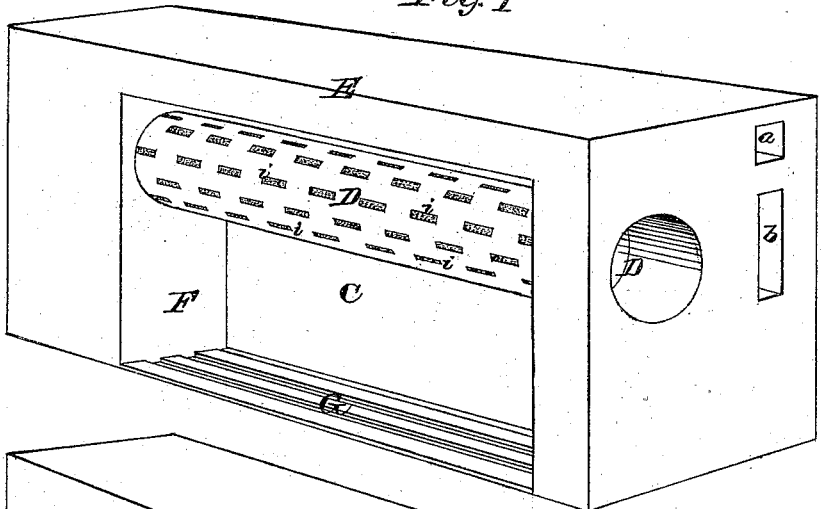

Figure 1, plate 1, is a perspective view of part of a puddling-furnace, exposing the interior of the fire-chamber and air-inlet pipe.

Figure 2:
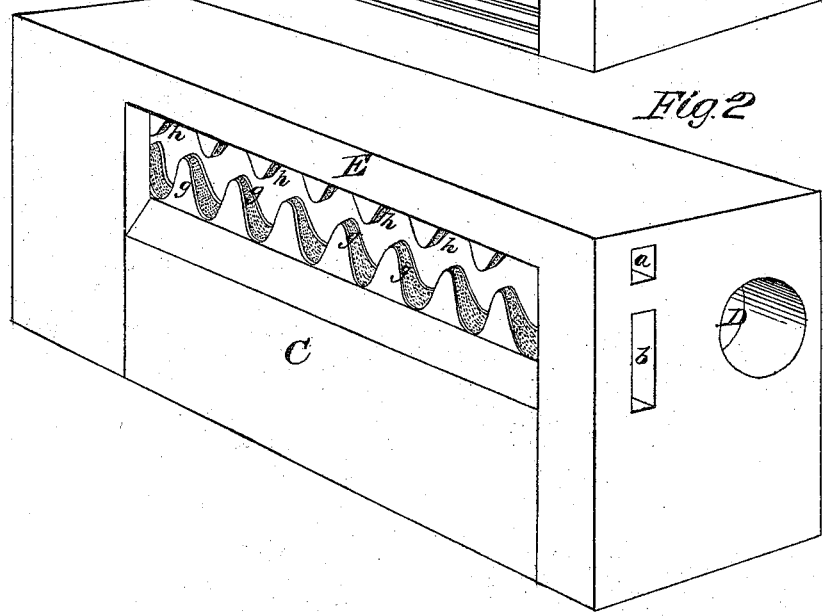

Figure 2, plate 1, is a perspective view, exposing the bridge-wall and its air-inlets, and also the air-inlets above the bridge-wall.

Figure 3, plate 2, is a section through the bridge-wall and crown of the furnace, taken in the vertical plane indicated by dotted line $y\ y$, fig. 4.

Figure 4, plate 2, is a section through fig. 3, taken in the vertical plane indicated by dotted line $x\ x$ in fig. 3.

Figure 5, plate 2, is a sectional view, showing a modification of the air-inlets of the bridge-wall and of the crown of the furnace.

Similar letters of reference indicate corresponding parts in the several figures.

This invention relates to improvements which are especially applicable to the furnaces of steam-boilers, puddling-furnaces, and furnaces of other kinds, and which are designed for increasing combustion therein by producing a more complete consumption of the gases evolved from the fuel.

The nature of my invention consists—

First, in mixing heated air, in fine jets, with the gases rising from the fire-chamber of a furnace, and, at the same time, spreading the flame into thin sheets by means of a thickly-perforated pipe arranged between the bridge-wall and crown of the furnace, and in close relation to finely perforated air-conduits, which present waved surfaces, as will be hereinafter explained.

Second, in protecting portions of the air-inlet conduits in the bridge-wall and crown of the furnace by embedding them into the masonry of said walls, as will be hereinafter explained.

To enable others skilled in the art to understand my invention, I will explain its construction and operation In the accompanying drawing I have represented my improvements applied to a puddling-furnace, but do not confine myself thereto, as the improvements are equally applicable to and useful for all varieties of furnaces which are inclosed by walls of masonry.

F represents the fire-chamber; G, the grate thereof; C, the bridge-wall of the furnace, all of which parts may be constructed in the usual manner.

D represents an air-conduit, which may be horizontal, or constructed in the form of an arch, and which is supported at its extremities by the vertical walls inclosing the fire-chamber, so that air can enter it freely at both ends. This pipe is located in the throat, between the crown-wall and upper portion of the bridge-wall, in such manner that the flame and products of combustion rising from the fuel on the grate below will be divided into two sheets before passing over the center of the bridge-wall.

The pipe D is thickly perforated for allowing the escape of air in a heated state, and in fine jets, into the flame which surrounds this pipe.

It will be seen, by reference to figs. 4 and 5, that pipe D has the perforations $i$ entirely around it, and from one end to the other, so that the jets of air are directed upward and downward, and horizontally into the fire-chamber at the point where the flame is arrested and divided by said pipe. By this means there is an abundant distribution of heated air among the products of combustion, and they are thoroughly charged with this air.

A B represent two air-conduits, arranged in a vertical plane passing centrally and longitudinally through the bridge-wall C.

The conduit B is partly embedded in the ridge of the bridge-wall C, and the conduit A is partly embedded in the crown E of the furnace.

Those portions of these conduits which are exposed inside of the furnace present waved surfaces, shown in figs. 2 and 3, so arranged in relation to each other as to form a serpentine or zigzag flue, through which the flame and products of combustion are compelled to pass on their way out of the fire-chamber F.

The bottom surfaces of the exposed portions $h$ and the upper surfaces of the exposed portions $g$ of said conduits are thickly perforated for the escape of air, which enters the conduits at $a\ b$ into the said serpentine space or flue.

The ascending jets of heated air from conduit B and the descending jets of heated air from conduit A will pass across the flue-space and thoroughly mix with the products of combustion passing through this space.

The conduits A B may be made in the form of an arch, or they may be arranged in horizontal planes. They may be made of iron or of any other suitable material.

The upper conduit A may receive air through openings made vertically through the crown E, in addition to the end openings $a\ a$.

It will be seen from the above description—

First, that the flame and products of combustion are divided vertically into two sheets, and, at the same time, thoroughly supplied with heated air, in fine jets, by means of the pipe D, before they reach the throat above the bridge-wall.

Second, that the two sheets of flame and products are subsequently spread out laterally, and, at the same time, brought together vertically in a thin sheet by means of the zigzag or serpentine flue, the opposite surfaces of which are thickly perforated for the escape of heated air, in fine jets, from the two conduits A B.

Third, that the unexposed portions of the conduits A B are embedded into their respective walls, and thus protected from injury by the action of intense heat.

By this mode of constructing a furnace the inflammable products rising from the fire-chamber will be intimately mixed with heated air and consumed before escaping from the furnace.

In fig. 5 I have represented wings or flanges, $c$ $c$, formed on the upper conduit A for the purpose of sustaining the brick-work of the arch or crown of the furnace.

Having described my invention,

What I claim as new, and desire to secure by Letters Patent, is—

1. The combination of the perforated pipe D with the conduits A B, the latter being constructed with perforated waved surfaces or extensions, $g$ $h$, substantially as described.

2. The conduits A B, constructed as described, and partly embedded in the furnace-walls, substantially as described.

3. The arrangement in the throat of a furnace, between the bridge-wall C and crown E of a perforated pipe, D, and perforated conduits A B, substantially as described.

WILLIAM FORDYCE BEECHER.

Witnesses:
JOHN B. HERRON,
WM. A. McCLELLAND.